June 22, 1943. F. J. ARMSTRONG 2,322,500
SAFETY TUBE FOR PNEUMATIC TIRES
Filed June 14, 1941
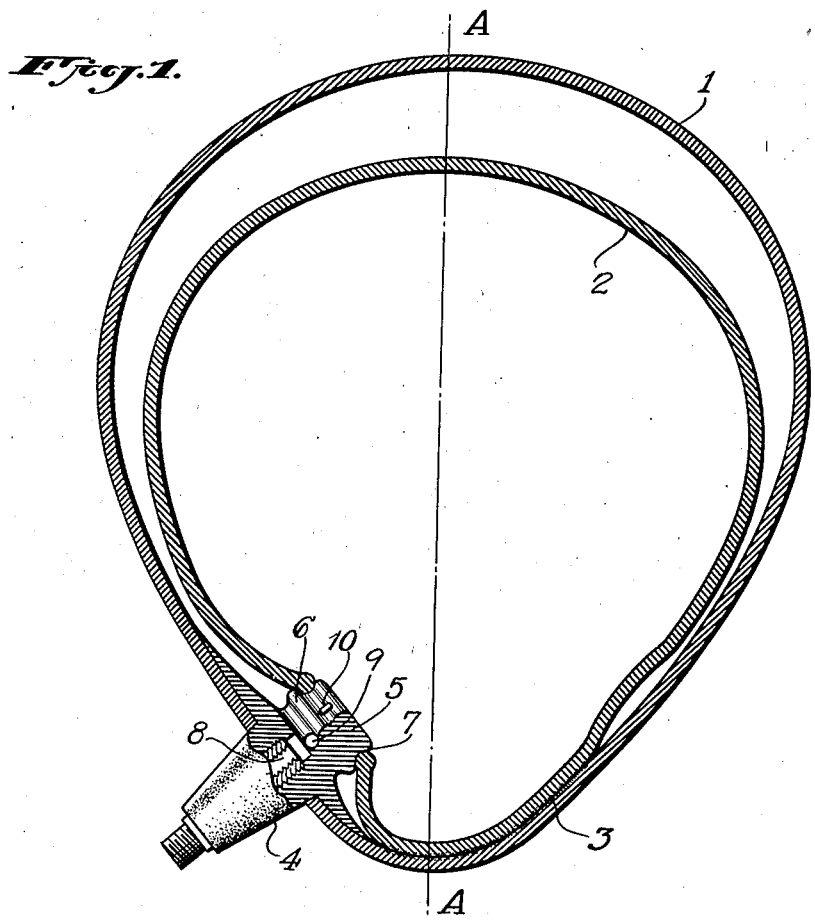
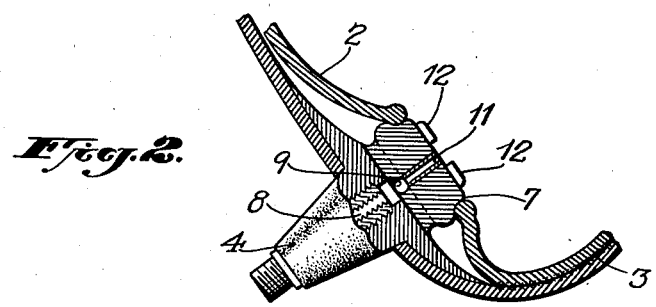
INVENTOR.
FRANK JOHN ARMSTRONG.
BY
Benj. T. Rauber ATTORNEY Patented June 22, 1943

2,322,500

UNITED STATES PATENT OFFICE 2,322,500

SAFETY TUBE FOR PNEUMATIC TIRES

Frank John Armstrong, Erdington, Birmingham, England, assignor to Dunlop Tire and Rubber Corporation, Buffalo, N. Y., a corporation of New York Application June 14, 1941, Serial No. 398,012
In Great Britain January 1, 1940

6 Claims. (Cl. 152—342)

This invention relates to improvements in safety tubes for pneumatic tires of the kind comprising inner and outer tubular members spaced apart at the tread, the inner tubular member of which is adapted to remain inflated for a period sufficient to enable the vehicle to be brought safely to rest when the outer member is punctured.

A tube of this kind has already been proposed in the French Patent No. 586,003 dated November 21, 1923, in which the tube is provided with an inflation valve through which air under pressure is supplied directly to the inner tube member and thence through one or more small apertures to the space between said members for the purpose of equalizing the air pressure between said members.

In the kind of safety tube described above the smallness of the aperture or apertures in the wall of the inner tubular member serves to restrict the escape of air therefrom for a period sufficient to support the outer cover of the pneumatic tire while the vehicle is brought safely to rest.

The smallness of the aperture or apertures necessary for this purpose, however, renders the inflation of such a safety tube a somewhat lengthy operation since the rate of inflation is restricted by a valve having a bore reduced to correspond with that of the apertures in order to avoid undue initial pressure on the inner member, which might lead to internal deformation and damage.

My invention retains the essential safety features desired but obviates the inconvenience of slow inflation by enabling a valve to be incorporated through which inflation may be effected at the usual rate.

According to my invention I provide a safety tube for a pneumatic tire comprising inner and outer tubular members spaced apart at the tread and joined together adjacent the base of the tube, wherein a portion of said inner member is formed with an aperture obstructed but not sealed on deflation of said outer member by the displacement of said portion of the inner tubular member into contact with the base of an inflation valve secured to the outer member and provided with a passage through which air is admitted to the space between said members.

The various features of my invention are illustrated, by way of example, in the accompanying drawing in which;

Fig. 1 is a part sectional view of one form of the invention. Fig. 2 is a part sectional view of a modification thereof.

Referring to the drawing the improved tube comprises outer and inner tubular members 1 and 2 which are spaced apart beneath the tread and joined together adjacent the base over an area 3 which extends circumferentially adjacent the midplane A—A of the tube. An inflating valve 4 of standard construction is secured as by vulcanization to the wall of the outer member 1 and the base of this valve is modified by being formed with a dome shaped boss 5 having a rounded flange 6 which is formed adjacent the central portion of the boss and is positioned between the outer and inner tubular members.

The boss 5 projects into an aperture 7 formed in the inner tubular member 2 and the air passage 8 of the valve 3 terminates in a passage 9 extending transversely of the boss 5 so as to open beneath the rounded flange 6.

The inner tubular member 2 consists of a tube or part tubular wall of rubber which may be reinforced with textile or other fabric at its base and/or tread portion as desired, and the edge of the aperture may be of enlarged or beaded section.

The diameter of the aperture 7 in the inner tubular member is such that the portion of the tubular member around it registers with the boss 5 formed on the valve and seats upon the rounded flange 6 formed thereon.

As shown in Fig. 1 the boss 5 is provided with one or more small axially extending ribs 10 serving to permit a small leakage of air between the edge of the aperture and the boss into the space between the inner and outer tubular members consequent upon deflation of the latter.

Alternately, for the same purpose the boss 5 may be centrally perforated as shown in Fig. 2 in a radial direction and be provided with a fine diameter tube 11 of the order of $\frac{1}{32}$ of an inch, one end of the tube opening into the central space bounded by the inner tubular member 2 and the other end merging into the passage 9 extending transversely of the boss. Ribs 12 may be provided to prevent the tube 2 from sealing the end of the tube 11.

The operation of the tube described above is as follows:

Compressed air supplied to the valve at the rate normally employed to inflate an inner tube passes through the passage formed in the boss and out through the lateral openings beneath the flange into the space between the inner and outer tubular members.

As the air pressure between the tubular members increases the inner tubular member and its apertured portion is lifted up from the flange 6 formed on the boss 5 thereby permitting the air pressure to equalize itself between the spaces contained by the inner tubular member 2 and between this member and the outer tubular member 1, the tread portion of which normally supports the cover of the tire.

It will be noted that where the boss is perforated by a fine diameter tube a small proportion of the air supply will enter the central space directly but the major portion indirectly as described in the preceding paragraph.

On puncture of the outer tubular member the air pressure in the space between the said members falls below that of the air contained in the inner member, the apertured portion of which is thereby forced into contact with the flange on the boss so as almost wholly to obstruct the aperture.

The escape of air from the inner member to atmosphere is thus prevented except for the small leakage permitted by the rib or ribs or fine diameter tube, thereby ensuring a sufficient period for the vehicle to be brought to rest in safety.

What I claim is:

1. A safety tube for a pneumatic tire comprising an outer tube wall, an inflation valve mounted in, and having a boss projecting inside, said outer wall, said boss having an inlet passage, and an inner tube wall secured within said outer tube wall and spaced therefrom at said boss and having an aperture, the edge of said wall about said aperture being seated on said boss beyond said inlet passage and free to lift from said boss to permit passage of air freely from the space between said tube walls to the space within said inner tube, means restricting passage of air in either direction between the space within said inner wall and the space between said walls when the edge of said inner tube wall about said aperture is seated on said boss.

2. A safety tube according to claim 1 wherein said aperture is formed with a beaded edge.

3. The safety tube of claim 1 in which said boss comprises a flange of greater diameter than said aperture in said inner wall and positioned between said inner wall and said inlet passage to support said wall on said boss.

4. The safety tube of claim 1 in which the means restricting the passage of air in either direction comprises one or more axially extending ribs on said boss positioned to support the edge of said inner wall about said aperture slightly from the boss.

5. The safety tube of claim 1 in which said means restricting the passage of air in either direction comprises a small diameter passage communicating with the space within said inner wall and the space between said walls.

6. A valve casing for the inner tubes of pneumatic tires having an intermediate zone to secure said casing in an opening in said inner tube and having an inwardly projecting part and an outwardly projecting part on opposite sides of said zone, a circumferential flange on said inwardly projecting part spaced from said zone, a passage through the outward projection of said casing and opening through said inner projection between said zone and said flange, and ribs on said casing on the opposite side of said flange from said zone.

FRANK JOHN ARMSTRONG.